United States Patent [19]

Johnson

[11] 4,272,092
[45] Jun. 9, 1981

[54] AGRICULTURAL TRANSPORTER

[76] Inventor: Gerald T. Johnson, Kulm, N. Dak.

[21] Appl. No.: 107,447

[22] Filed: Dec. 26, 1979

[51] Int. Cl.³ ............................................. B62D 25/00
[52] U.S. Cl. ................................ 280/43.23; 172/240;
172/413; 172/631
[58] Field of Search ..................... 280/43.23, 405 B;
172/240, 413, 776, 397, 418, 415, 625, 624, 627,
631, 657

[56] References Cited

U.S. PATENT DOCUMENTS

| 2,226,586 | 12/1940 | Seaholm | 172/240 |
|---|---|---|---|
| 2,921,640 | 1/1960 | Roppel | 172/240 |
| 2,938,588 | 5/1960 | Stein | 172/240 |
| 3,799,568 | 3/1974 | Hager | 280/37 |
| 3,884,309 | 5/1975 | Schneider | 172/240 |
| 3,913,683 | 10/1975 | Olsson | 172/240 |
| 4,127,283 | 11/1978 | Baden | 172/240 |
| 4,157,735 | 6/1979 | Olsson | 172/240 |

Primary Examiner—Robert R. Song
Attorney, Agent, or Firm—Merchant, Gould, Smith, Edell, Welter & Schmidt

[57] ABSTRACT

A transporter for a pair of transversely elongated agricultural implements (20, 21) having first, mutually remote ends and second ends in abuting apposition, the implements including forward support wheels (36) and arrays (44, 45, 46) of pivotally mounted rearward packer wheels. The transport comprises first and second frames (114) attached rigidly to the backs of the implements near their abutting ends, first and second wheel assemblies (121, 126, 137, 143, 144) mounted in the frames for linear vertical movement with respect to the lower ends of the frames, a latch arrangement 150-157 actuable between an inoperative position and an operative position in which increase in the transverse displacement between the upper ends of the frames is prevented, and hydraulic motors (132, 145, 160) arranged for simultaneous energization to move the wheel assemblies and actuate the latch arrangement so as to first cause the wheels to move downward into contact with the ground, then cause actuation of the latch arrangement, and then continue downward movement of the wheels to raise the frames so that the packing wheels are out of contact with the ground, and the latch arrangement prevents sagging of the mutually remote ends of the implements. The latch arrangement also functions (170-175) to resiliently pivot the packer wheels upwardly in the implements.

8 Claims, 6 Drawing Figures

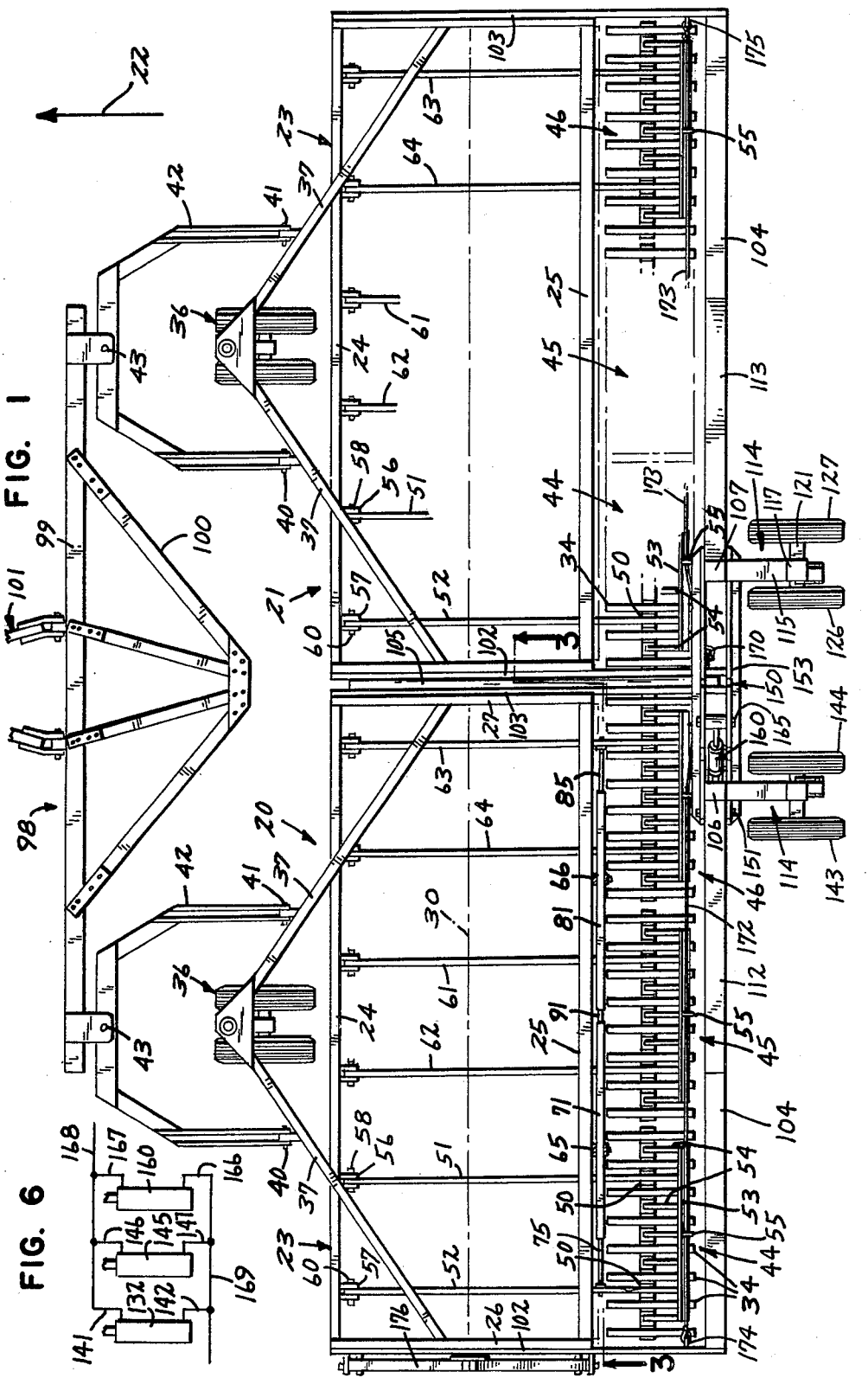

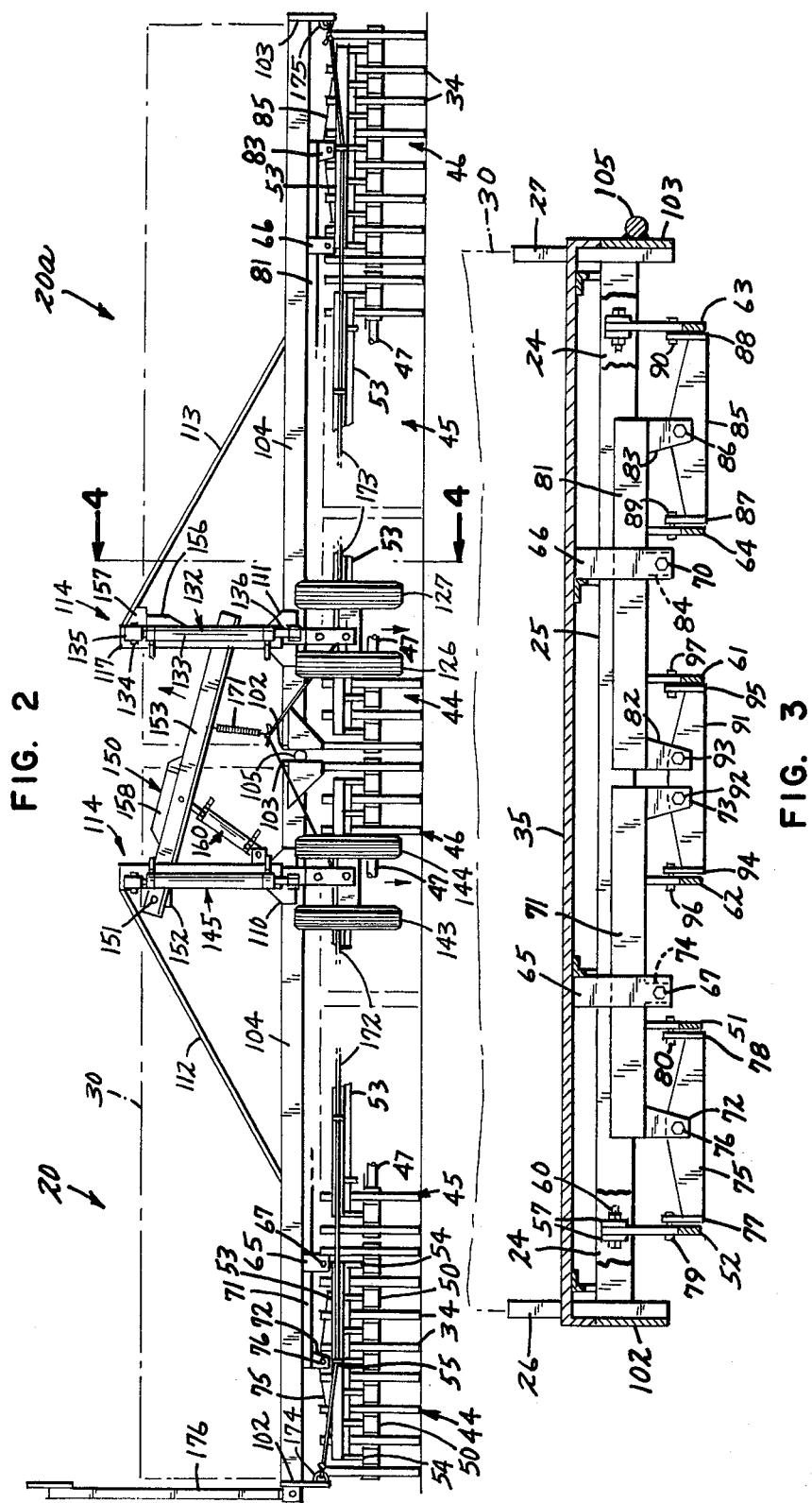

AGRICULTURAL TRANSPORTER

TECHNICAL FIELD

This invention relates to the field of agricultural engineering, and particularly to a transporter by which agricultural implements of considerable transverse dimensions may be drawn not only across a field to be worked, but along public roads from one such field to another.

BACKGROUND OF PRIOR ART

In modern farm operations in many rural areas each farm comprises a number of more or less widely separated fields to be worked, rather than a single large field, and it is necessary not only to draw implements such as seeders across the fields, but also to transport the implements from field to field, frequently by the use of public highways.

It is generally well-known that modern farm tractors are sufficiently powered to enable the use of a plurality implements in side-by-side field operations, thus reducing the number of passes needed to cover a field of given width and so increasing the time-effectiveness of the farming operation. Such a multiple implement arrangement, however, is usually too wide to pass through farm gates, or to be transported on the public roads, the traffic lanes of which are frequently not much wider than a single implement. Wideness of his gates is within a farmer's control, but he may not block the full width of a public road in moving his equipment from one field to another.

The time and effort involved in disconnecting implements from a tractor, transporting them separately from field to field, and recoupling them at the new location are prohibitively great.

Attempts to relieve this situation have taken advantage of the fact that implements are frequently shorter than they are wide. One expedient has involved loading the coupled implement sideways on a long trailer, transferring the tractor to the end of the trailer, and drawing the latter endwise along the road. Another expedient has involved providing the combined implements with auxiliary wheels, orthogonal to the working wheels, which can be lowered to lift at least some of the latter from the ground, and recoupling the tractor to the end of the assembly instead of to the sides thereof. These arrangements limit the front-to-back dimension of the implements being transported.

BRIEF SUMMARY OF THE INVENTION

The present invention takes advantage of the fact that rights-of-way, even of minor public roads, include not only the paved traffic lanes but the shoulders and ditches on either side. While a ditch is not suitable to support an implement in transport, this is not true of the shoulder, and I have invented a transporter by which one of a laterally abutting pair of such implements can travel in the space over the ditch beside the road, being supported by wheels moving along the shoulder, so that the traffic lane is wide enough for the second implement of the pair. In this arrangement implements of any desired front-to-back dimension may be transported without interfering with on-coming traffic.

My transporter is a structure of two portions secured respectively to the backs of the implements in question at their abutting ends. The implements are coupled in front by a suitable hitch to the drawbar of a towing tractor, in a manner which does not interfere with the operation of the front castor wheels of the implements. Each portion of the structure has transport wheels which may be raised to permit field work, or lowered to coact with the caster wheels and lift the rear of the implement out of contact with the ground. As this occurs, the upper ends of the two portions are locked together, so that each implement acts as a counterweight for the other about a generally central site where the transport wheels are situated. A pivot or contact member is provided at the site of contact between the abutting implements, near the ground. Means are also provided for raising movable components of the implements in their frames, to reduce the vertical travel required of the transport wheels.

Various advantages and features of novelty which characterize my invention are pointed out with particularity in the claims annexed hereto and forming a part hereof. However, for a better understanding of the invention, its advantages, and objects attained by its use, reference should be had to the drawing which forms further part hereof, and to the accompanying descriptive matter, in which there is illustrated and described a preferred embodiment of the invention.

In the drawing like reference numerals indicate corresponding parts throughout the several views.

BRIEF DESCRIPTION OF THE DRAWING

In the drawing, FIG. 1 is plan view of an embodiment of the invention, some conventional parts being omitted for clarity of illustration;

FIG. 2 is a similar view of my invention in rear elevation, showing the invention in its field-working condition;

FIG. 3 is a fragmentary view in section taken along the line 3—3 of FIG. 1;

FIG. 6 is a hydraulic diagram.

DETAILED DESCRIPTION OF THE INVENTION

Figure 5:
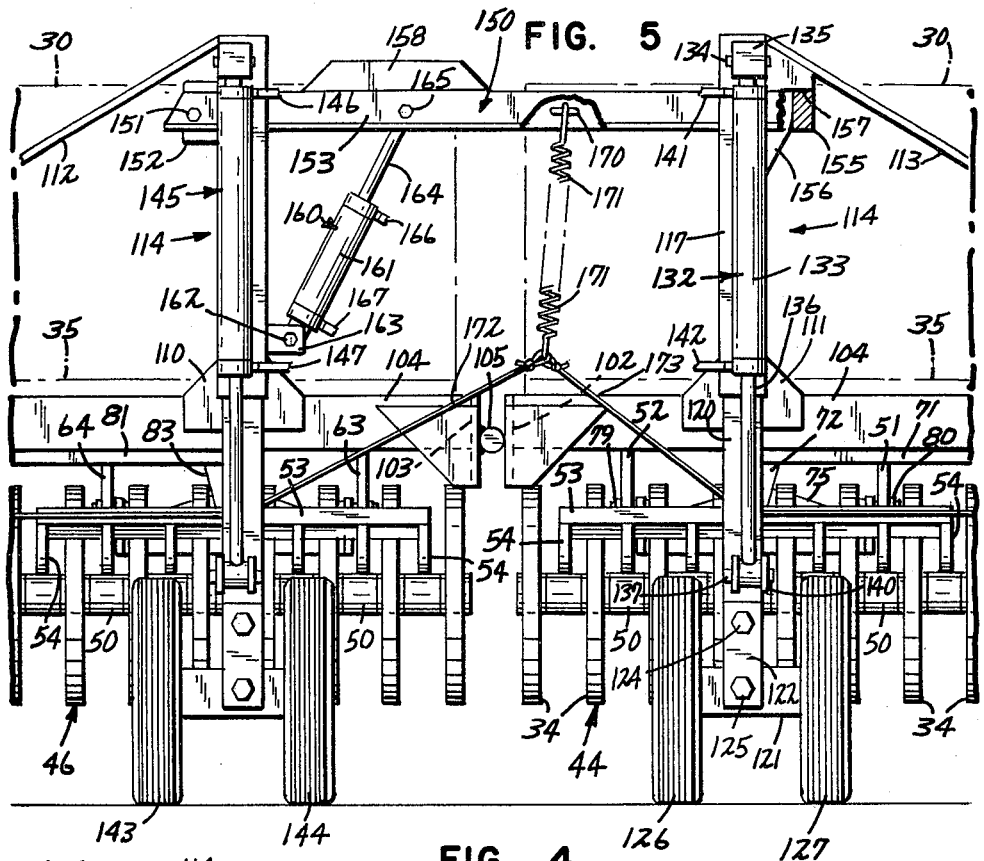
FIG. 5 is a fragmentary view generally like FIG. 2, but to a larger scale and showing the invention in its transport condition.

The drawing shows my invention in use with a pair of seeders 20 and 21, positioned side by side for working movement in the direction of the arrow 22. Since the implements themselves are conventional, they are not shown in full detail, parts not pertinent to my invention being omitted or shown schematically. The seeders are identical, and the following description of seeder 20 applies equally well to seeder 21.

Seeder 20 is assembled on a rigid frame 23 having a front cross beam 24, a rear cross beam 25, and end members 26 and 27. As suggested in FIG. 4 the frame supports an elongated covered hopper 30 for seed to be distributed through a seeding mechanism 31 and a flexible tube 32 to a furrow in the ground opened by means such as a shovel plow or a pair of coulter wheels 33, and closed by a press wheel 34. It will be appreciated that members 30–34 are replicated at short intervals for the full transverse length of hopper 30.

The seeder also includes a foot board 35 extending thereacross behind and below hopper 30, and a forward caster wheel assembly 36 mounted on frame 23 in a suitable bracket 37 to which there is pivoted, at fasteners 40, 41, a suitable draft bow 42 including a linch pin 43. The mountings for coulter wheels 33 are conventional, and need not be explained specifically.

The mountings for wheels 34 are also conventional, but should be explained to ensure understanding of a portion of my invention. Wheels 34 are grouped in identical gangs 44, 45, 46: as suggested in FIGS. 2 and 4 the wheels of gang 44 of unit 21, for example, are rotatable on a common shaft 47 supported near one end in a first bearing 50 carried by a first drawbar 51 and supported near the other end by a second similar bearing carried by a second drawbar 52. The rear ends of the drawbars extend behind the press wheels and are interconnected by a cross member 53, from which a plurality of clearing fingers 54 project forward into the spaces between the wheels. A loop 55 is secured centrally to member 53 for a purpose presently to be described. The front ends of the drawbars are pivoted to beam 24 at brackets 56 and 57, by fasteners 58 and 60, all respectively, the pivotal axes being horizontal. Similar drawbars 61, 62 are provided for wheel gang 45, and are similarly interconnected and pivoted: in like manner drawbars 63 and 64 are provided for wheel gang 46.

The weight of the seed in hopper 30, and that of the back of the implement generally, are distributed to the wheels of gangs 44-46 by an evener system shown best in FIG. 3. A pair of brackets 65 and 66 of inverted U-shape are secured behind rear beam 25: they project upward to support footboard 35, and downward to support pivot pins 67 and 70. An evener beam 71 of rectangular tubing has a pair of ears 72 and 73 extending downward at its ends, and a further ear 74 extending downward between them for receiving pin 67 and so pivoting beam 71 in bracket 65. A yoke 75 for wheel gang 44 is centrally pivoted to ear 72 at a fastener 76, and the ends 77 and 78 of yoke 75 are connected to drawbars 52 and 51, at sites spaced forwardly from shaft 47, by suitable fasteners 79 and 80, which allow slight freedom of relative motion between the yoke and the drawbars.

The arrangement for transferring vehicle load to wheel gang 46 is like that described. It includes a second evener beam 81 of rectangular tubing having ears 82 and 83 projecting downwardly at its ends, and an ear 84 projecting downwardly between them for receiving pivot pin 70 and so pivoting beam 81 in bracket 66. A yoke 85 for wheel gang 46 is centrally pivoted to ear 83 at a fastener 86, and the ends 87 and 88 of yoke 85 are connected by suitable fasteners 89 and 90 to drawbars 64 and 63 at sites spaced forwardly from the press wheels.

The arrangement for transferring vehicle load to wheel gang 45 is generally the same, but differs in detail. A yoke 91 is pivoted to ears 73 and 82 of evener bars 71 and 81 at spaced fasteners 92 and 93, and the ends 94 and 95 of yoke 91 are connected by suitable fasteners 96 and 97 to drawbars 62 and 61 at sites spaced forwardly from the press wheels.

As shown in FIG. 1, implements 20 and 21 are coupled at linch pins 43 to a hitch 98 comprising a bar 99 strengthened by a truss work 100 and provided with a bow 101 for connection to the drawbar of a tractor, not shown. For use with my transporter, each of implements 20 and 21 is provided with a pair of reinforcing end plates 102 and 103 which project rearwardly behind wheels gangs 44-46 to support a boss member 104. The implements are so coupled to hitch 98 that their adjacent ends abut, at a cylindrical contact member 105 extending from front to rear along plate 103, to enable some relative pivotal movement between the implements at member 105.

Vertical columns 106 and 107 of rectangular metal tubing are mounted on members 104 by gusset plates 110 and 111, to project upwardly at sites spaced from the adjacent ends of the implements, and are reinforced by diagonal braces 112 and 113.

Figure 4:
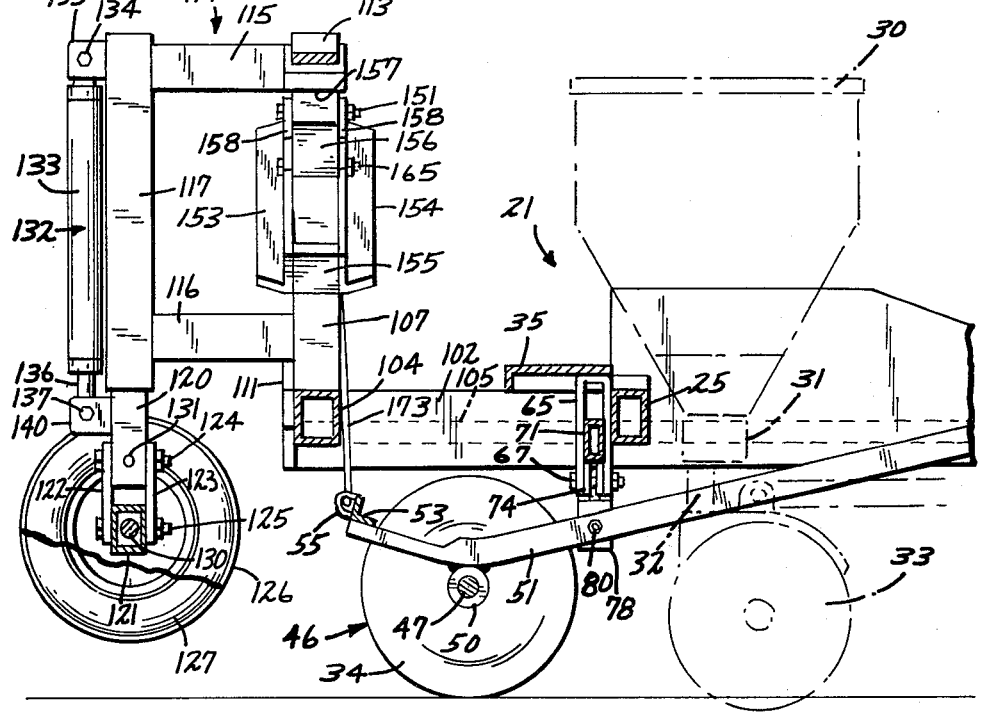
FIG. 4 is a fragmentary view to a larger scale, in section taken along the line 4—4 of FIG. 2, part being omitted for clarity of illustration.

Column 107 of implement 21 forms a part of a vertical rectangular frame 114 which is completed by upper and lower horizontal members 115 and 116 and a vertical guide member 117, of square metal tubing. A leg member 120 has a sliding fit within guide member 117, and a stub axle 121 is secured to the bottom of member 120 by cleats 122 and 123 and fasteners 124 and 125. A pair of transport wheels 126 and 127 are mounted at the ends of axle 121 for rotation about a common horizontal axis which is normally aligned transversely of the implement. In FIG. 4 a portion of wheel 127 has been omitted to show the spindle 130 on which it turns. By removing fastener 124, the axle and wheels may be separated from leg 120, rotated through 90° about the vertical axis of the leg, and replaced thereon with fastener 124 now passing through an alternative aperture 131 at the bottom of leg 120.

A linear hydraulic motor 132 has its cylinder 133 secured by a fastener 134 to a bracket 135 on member 117, and its piston 136 secured by a fastener 137 to a bracket 140 on leg 120. Upper and lower connectors for hydraulic fluid are provided at 141 and 142.

Column 106 at implement 20 forms a part of a similar vertical rectangular frame, which similarly carries a pair of transport wheels 143 and 144 and is similarly equipped with a linearly hydraulic motor 145 having connections 146 and 147 for hydraulic fluid.

A locking arm 150 is pivoted about a horizontal axis on a fastener 151 in a bracket 152 near the side of column 106 near its top, and comprises a pair of angle iron members 153 and 154 spaced by the dimensions of columns 106 and 107 to loosely engage the front and rear surfaces thereof. At their ends remote from fastener 151 members 153 and 154 are joined by a block 155. A ramp 156 is secured to the side of column 107 near its top, and includes a projecting stop shoulder 157. Members 153 and 154 may be reinforced near fastener 165 by plates 158. A third linear hydraulic motor 160 has a cylinder 161 pivoted at a fastener 162 to a bracket 163 on column 106, and a piston 164 pivoted at a fastener 165 to arm 150. Connections for hydraulic fluid are provided at 166 and 167. As shown in FIG. 2, hydraulic motors 132, 145, and 160 are interconnected for simultaneous energization to extend their pistons, power fluid being supplied by conduit 168 at connections 141, 146, and 167 and returned from connections 142, 147, and 166 by conduit 169.

Also secured to arm 150, by a fastener 170, is the upper end of a tension spring 171. A pair of cables 172 and 173 are secured to the lower end of spring 171. Cable 172 passes through the loops 55 of wheel gangs 46, 45 and 44 of implement 20 and is secured to end plate 102 at a fastener 174. Cable 173 passes through the loops 55 of the wheel gangs of implement 21, and is secured to end plate 103 at a fastener 175.

A second tractor hitch 176 may be pivotally connected to end plate 102 to increase the versatility of the transporter.

Operation

To prepare implements for use in my transporter, the implement 21 which is to be on the right is equipped with plates 102 and 103, cross member 104, contact member 105, column 107, and components 113-142, 156 and 157. The other implement 20 is similarly equipped with plates 102 and 103, cross member 104, column 107, and components 112, 114-131, 145-7, and 160-167. The implements are brought together in transverse alignment, so that they abut at member 105, and connections are made at linch pins 43 to hitch 98. Arm 150 is assembled and pivoted to column 106 at fastener 151 so that it hangs down with block 155 engaging column 107. Hydraulic connections 141, 146 and 167 are led to a source of pressure fluid, and the hydraulic circuit is completed through return conductors 142, 147 and 166. Loops 55 are secured to drawbars 51, 52, and 61-64, and cables 172 and 173 are connected to spring 171, fed through the respective loops, and secured at 174 and 175.

Now when a tractor coupled to bow 101 draws the combined implements forward, their weight is carried in part by the forward caster wheels in assemblies 36 and in greater part by the press wheels 34 of the several gangs 44-46. It will be clear that if the ground being traversed is not even, pivotal movement between the implements to follow the land is possible at member 105, the tops of columns 106 and 107 moving or away from each other at the same time, and that individual movements of each press wheel gang to follow the ground is made possible by their pivotal connection to frame 23 through the drawbars, evener beams, and yokes.

When it is desired to transport the implement from one field to another, motors 132, 145, and 160 are supplied with pressure fluid, and their pistons move out of their cylinders, substantially simultaneously. When transport wheels 126, 127, 143 and 144 engage the ground and encounter resistance, operation of motors 132 and 145 is momentarily arrested, since the fluid finds a path of less resistance in motor 160. Accordingly, arm 150 pivots in a counterclockwise direction until block 155 slides up ramp 156 and engages stop 157. This forces operation of motor 160 to cease, and the fluid again acts in motors 132 and 145 to force the transport wheels downward and lift the adjacent ends of the implements from the ground. Relative pivoting movement of the implements at member 105 is prevented at this time because engagement of plate 157 with the surface of column 107 prevents the columns from spreading at their tops, and so the back portions of the implements are lifted from the ground in essentially a level attitude. At the same time spring 171 acts through cables 172 and 173 and hooks 55 to lift the press wheel gangs, pivoting drawbars 51, 52 etc. at beam 24, so that the travel range required of motors 132 and 145 is correspondingly reduced.

This situation continues as long as the hydraulic motors are energized. Now if a tractor drawing the assembly moves along a road so that the transport wheels travel near the righthand edge of the paving or on the shoulder, implement 21 moves through the space over the righthand ditch, and implement 20 moves through the space above the righthand traffic lane, so that the lefthand traffic lane is unimpeded.

An advantage of this arrangement is that, if desired, auxiliary implements such as seeder-weeder attachments may be interposed between implements 20, 21 and draft bows 42, caster wheel assemblies 36, being moved forward under the accessories if necessary. Although these additions may considerably increase the length from front to back of the implement assembly, they do not increase the amount of interference of the assembly with the traffic on public roads, as would be the case should the assembly be transported "sideways" on a trailer.

Occasion may arise when it is desirable to be able to move a combined implement of this sort in crowded quarters, where the capability of endwise motion is advantageous. If this situation arises, hydraulic fluid is supplied to motors 132, 145 and 146 until the transport wheels just touch the ground. Fastener 124 is removed, leg 120 is raised hydraulically out of cleats 122 and 123, axle 121 and wheels 125 and 126 are turned about a vertical axis through 90° and realigned with leg 120, the latter is again lowered hydraulically, and fastener 124 is inserted through aperture 131 and tightened. The same operation is repeated for transport wheels 143 and 144. Now if the tractor is uncoupled at bow 101, hitch 175 is lowered and coupled to the tractor, and the hydraulic motors are energized, initial endwise movement of the frame causes the caster wheels to pivot about vertical axes, and the implement can thereafter follow the tractor in a direction perpendicular to the ordinary working direction. Return to a normal state is accomplished by a reverse procedure.

From the foregoing it will be evident that I have invented a transporter for multiple farm implements drawn from behind a tractor which does not interfere with the use of the implements in field work, yet enables transport of the implements on the public roads without unduly interfering with traffic, by so supporting the implements that one travels through the space over the traffic lane and the other through the space over the adjacent ditch, the implements being supported by transport wheels travelling near or on the shoulder of the road, and the ends of the implements remote from the transport wheels being supported by a mechanism actuated concurrently with the actuation of the transport wheels into operation.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A transporter, for a pair of transversely elongated agricultural implements having first, mutually remote ends and second ends in abutting apposition, said implements including forward support wheels and arrays of pivotally mounted rearward packer wheels, said transporter comprising, in combination:
   first and second frames;
   means attaching said frames rigidly to the backs of said implements near the apposed ends thereof to extend between upper and lower ends;
   first and second wheel means;
   means mounting said wheel means in said frames for linear vertical movement with respect to said lower ends of said frames;
   first motor means for displacing said wheel means between first positions, out of contact with the ground behind said implement, and second positions, in which they contact the ground and raise said frames thereabove;

latch means actuable between an inoperative position and an operative position in which increase in the transverse displacement between said upper ends of said frames is prevented;

second motor means for causing operation of said latch means;

and means for energizing said motor means so as to first cause said wheel means to move into contact with the ground, then cause operation of said latch means, and then raise said frames with respect to the ground so that said packing wheels are out of contact with the ground and said latch means prevents sagging of said mutually remote ends of said implements.

2. A transporter, for a pair of transversely elongated agricultural implements having first, mutually remote ends, and second ends in abutting apposition, and including forward support wheels and rearward packer wheels, said transporter comprising, in combination:

first and second frames;

means attaching said frames rigidly to the backs of said implements near the apposed ends thereof to extend vertically between upper and lower ends;

first and second further wheel means;

means mounting said further wheel means in said frames for vertical movement with respect to said lower ends of said frames;

motor means for displacing said wheel means between first positions, out of contact with the ground behind said implement, and second positions in which they contact the ground and raise said frames thereabove;

latch means actuable between an inoperative position and an operative position in which increase in the transverse displacement between said upper ends of said frames is prevented;

further motor means for causing operation of said latch means;

and means energizing said motor means to first cause said further wheel means to move into contact with the ground, then cause operation of said latch means, and then raise said frames with respect to the ground, so that said packing wheels are out of contact with the ground and said latch means prevent sagging of said mutually remote ends of said implements.

3. A transporter according to claim 1 and means actuated by said latch means in the operating position thereof to cause upward pivotal motion of said packer wheels.

4. A transporter according to claim 1 in which said latch means comprises a pair of members spaced to receive of said frames, means pivoting said members at first ends to one of said frames near the top thereof to extend across the space between said frames, means interconnecting said members at their ends remote from the pivot, a ramp on the other of said frames for engagement by the last-named means, and stop means for preventing pivotal movement of said members past said ramp;

and in which said second motor means acts between said one of said frames and a site on said members between said first and second ends thereof and between said frames, to move said latch means into and out of engagement with said ramp and said stop means.

5. A transporter according to claim 4 further including means fastened to said latch means for resiliently pivoting said packer wheels upwardly when said latch means is pivoted to engage said stop means.

6. A transporter according to claim 1 including means enabling said wheel means to be given first positions, in which their axes extend transversely of said implements, and second positions, in which said axes extend from front to back of said implements.

7. A transporter according to claim 1 in which said motor means are linear fluid motors, and the last-named means comprises means supplying pressure fluid to all said motors simultaneously.

8. The method of preparing for road transport a pair of drills connected in side-by-side abutting relation to have apposed ends and mutually remote ends, which comprises lifting the apposed ends of the drills on wheels contacting the ground behind the drills and preventing sagging of the mutually remote ends of the drills.

* * * * *

UNITED STATES PATENT AND TRADEMARK OFFICE
CERTIFICATE OF CORRECTION

PATENT NO. : 4,272,092
DATED : June 9, 1981
INVENTOR(S) : Gerald T. Johnson

It is certified that error appears in the above-identified patent and that said Letters Patent are hereby corrected as shown below:

Column 5, line 28 after "moving" insert -- toward --.

Signed and Sealed this

Twenty-second Day of September 1981

[SEAL]

Attest:

GERALD J. MOSSINGHOFF

Attesting Officer

Commissioner of Patents and Trademarks